United States Patent [19]

Harrigan

[11] 4,306,772

[45] Dec. 22, 1981

[54] PHOTOCHROMIC LIGHT LENS

[76] Inventor: Roy M. Harrigan, Bromley Mountain Rd., Manchester, Vt. 05254

[21] Appl. No.: 924,294

[22] Filed: Jul. 13, 1978

Related U.S. Application Data

[63] Continuation-in-part of Ser. No. 813,258, Jul. 6, 1977, abandoned, which is a continuation of Ser. No. 642,563, Jan. 19, 1975, abandoned.

[51] Int. Cl.$^3$ ................................................ G02F 1/17
[52] U.S. Cl. .................................................... 350/354
[58] Field of Search ................... 350/354; 331/94.5 Q

[56] References Cited

U.S. PATENT DOCUMENTS 3,365,678  1/1968  Maurer ........................... 350/160 P

OTHER PUBLICATIONS

Photochromism, ed. Brown, Wiley-Interscience (1971), p. 308.

*Primary Examiner*—William L. Sikes
*Attorney, Agent, or Firm*—Robert S. Smith

[57] ABSTRACT

A negative photochromic material which is responsive to the ultraviolet portion of the daylight spectrum comprises part of the lens of a light fixture. The material which is of the normally dark type varies the translucence of the lens so that more lumens of light are transmitted through the lens under daylight lighting conditions than at night.

6 Claims, No Drawings

PHOTOCHROMIC LIGHT LENS

BACKGROUND OF THE INVENTION

This application is a continuation-in-part application of Ser. No. 813,258 filed July 6, 1977, now abandoned, which was a continuation of Ser. No. 642,563 filed Jan. 19, 1975, now abandoned.

The invention pertains to lenses for lighting and lighting fixtures, more particularly the invention has application where it is desirable to pass substantially all the light emitted by a lamp under daylight lighting conditions and less than all the light under conditions where there is (1) artificial light having little ultraviolet in the spectrum thereof or (2) darkness. It will be understood that the invention while having particular application to the lenses of light fixtures on automobiles, also has application to the lenses of other lighting fixtures. The term lenses as used herein will be understood to refer to the translucent member which is part of a lighting fixture and allows light to pass from one side of the lens to the opposite side thereof. The term in this context does not normally refer to the meaning which is attached to the term in the optics field.

A common problem with the external indicator lights on an automobile such as stop lights, tail lights, parking lights, side indicator lights and license plate lights is that the lumen output of such lights under daylight lighting conditions is limited by the maximum light which is acceptable in darkness. The intensity of light has customarily been chosen with a trade-off made between a lumen output which is large enough to be seen in the daylight conditions and a lumen output which is not too large and therefore not too objectionable in darkness. Because of this compromise, the lighting on individual cars is frequently either objectionably bright when the car is operated at night or is inadequately bright when the car is operated under daylight lighting conditions. Many of the automobile drivers when following another vehicle in daylight lighting conditions have experienced times when a vehicle ahead will stop abruptly and the following driver has not perceived the stoplights indicating the imminence of the stop.

SUMMARY OF THE INVENTION

In one form of the invention the lens for lighting fixtures is provided with a negative photochromic material which is responsive to ultraviolet light. The lens under daylight lighting conditions where the lighting spectrum includes ultraviolet light will pass a substantially greater amount of light from one side of the lens to the other and the light will be sized to give adequate illumination under these conditions. Under darkness conditions and conditions where only artificial lighting is present the material in the lens will substantially reduce the translucence of the lens and avoid discomfort to other drivers which would create a safety hazard if a greater amount of the light passed through.

DETAILED DESCRIPTION OF THE PREFERRED EMBODIMENT

It will be understood that the invention has application to not only motor vehicle exterior lights but also to traffic lights which control the phasing of traffic flows from various directions. Another application is on instrumentation in cars where varying light intensity is desired. This is particularly important where a voltage control is not normally connected such as on indicator lights on stereo radios and tape decks. The negative photochromic material will vary with the particular application. The number of materials which are suitable for different applications is so large that the U.S. Army has provided at its Natick, Massachusetts laboratory a punch card file of such photochromic materials. Criteria to be employed in selecting the material include degree of translucence change desired, artificial light spectrum in the environment and response time. A discussion of various substances and preparations as well as the art is included in the book "Photochromism" edited by Glenn H. Brown, published by Wiley-Interscience a division of John Wiley and Sons Inc., New York, N.Y. 19007. For exterior lights on automobiles it is desirable that the photochromic substance respond in a time period of not less than 15 minutes to varying lighting conditions. This will insure that if a motor vehicle passes into a region of artificial light which has ultraviolet light included that the response time will be sufficiently long so the change will not be prematurely made. It is desirable that the photochromic substance be selected so that it is not responsive to infra-red and more generally the spectrum of typical street lighting or automobile headlights.

As used herein the term spiropyran is used to denote very generally a molecule containing 2H pyran ring in which the number-2 carbon atom of the ring is involved in a spiro linkage. Further, the molecule contains structural features such that after a heterolytic cleavage of the 1,2-single bond of the pyran ring, the charges of the resulting zwitterion are stabilized by resonance, in the usual sense that various valence-bond structures can be written. The generalized reaction is now generally believed to be responsible for photochromism in these compounds. The spiropyrans known to be photochromic meet the requirements of the above definition, but have relatively complex structures. It is known in the art that spiropyrans usually are not photochromic in the solid state, but show this phenomenon in solution. In a practical sense, the term solution includes not only dilute fluid solutions, but also more rigid media such as gels, plasticized resins, films, and bulk plastic solids, for example, of poly(methyl methacrylate). In accordance with a preferred form of the invention the preferred photochromic material is 2-methoxyethanol solutions of Crystal Violet, Malachite Green, Fuchsin, Acid Green 9, and Ethyl Green to which thiourea and concentrated hydrochloric acid has been added. The application of such solutions to the surface of conventional glass lenses used heretofore is preferred. Other materials exhibiting these negative photochromic characteristics include spiropyrans bearing free hydroxy, carboxy, or amino groups on either ring.

It will be understood that the procedures for application of photochromic materials to translucent glass are well known. It is also known in the art to provide glass material which is photochromic. Photochromic eyeglasses typically use such materials. The invention is not limited to the specific materials recited herein or merely the application of photochromic substances to a surface of a translucent or transparent glass. If the photochromic material selected is a solid the lens used may be completely made of the solid photochromic material. In other cases a "solution" may be held within a translucent housing or between translucent glass sheets where it will be exposed to ultraviolet rays to cause the photochromic reaction.

It will be understood that although the invention has been described in terms of a lens that is part of a lighting fixture, that it also has application to the glass envelope of lamps.

Having thus described my invention I claim:

1. Lighting apparatus which comprises:

a housing;

an incandescent source of light disposed in said housing;

a lens carried on said housing, said lens having first and second sides, said first side being exposed to light radiated from said incandescent source of light, said second side of said lens being exposed to light in the ambient of said apparatus; and means for varying the light transmittance from said first side of said lens to said second side of said lens as a function of the light which said second side of said lens is exposed to from the ambient of said apparatus, said means for varying the light transmittance not being responsive to the light from said incandescent source of light, said means comprising a negative photochromic material which in the presence of ultraviolet light increases the light transmittance of said lens.

2. The apparatus as described in claim 1 wherein said negative photochromic material increases transmittance only after sustained periods of exposure to ultraviolet light on said second side.

3. The apparatus as described in claim 1 wherein said photochromic material is carried on the surface of a glass support.

4. The apparatus as described in claim 1 wherein said photochromic material comprises Crystal Violet.

5. The apparatus as described in claim 1 wherein said photochromic material comprises Malachite Green.

6. The apparatus as described in claim 1 wherein said photochromic material comprises Fuchsin.

* * * * *